Patented Nov. 19, 1940

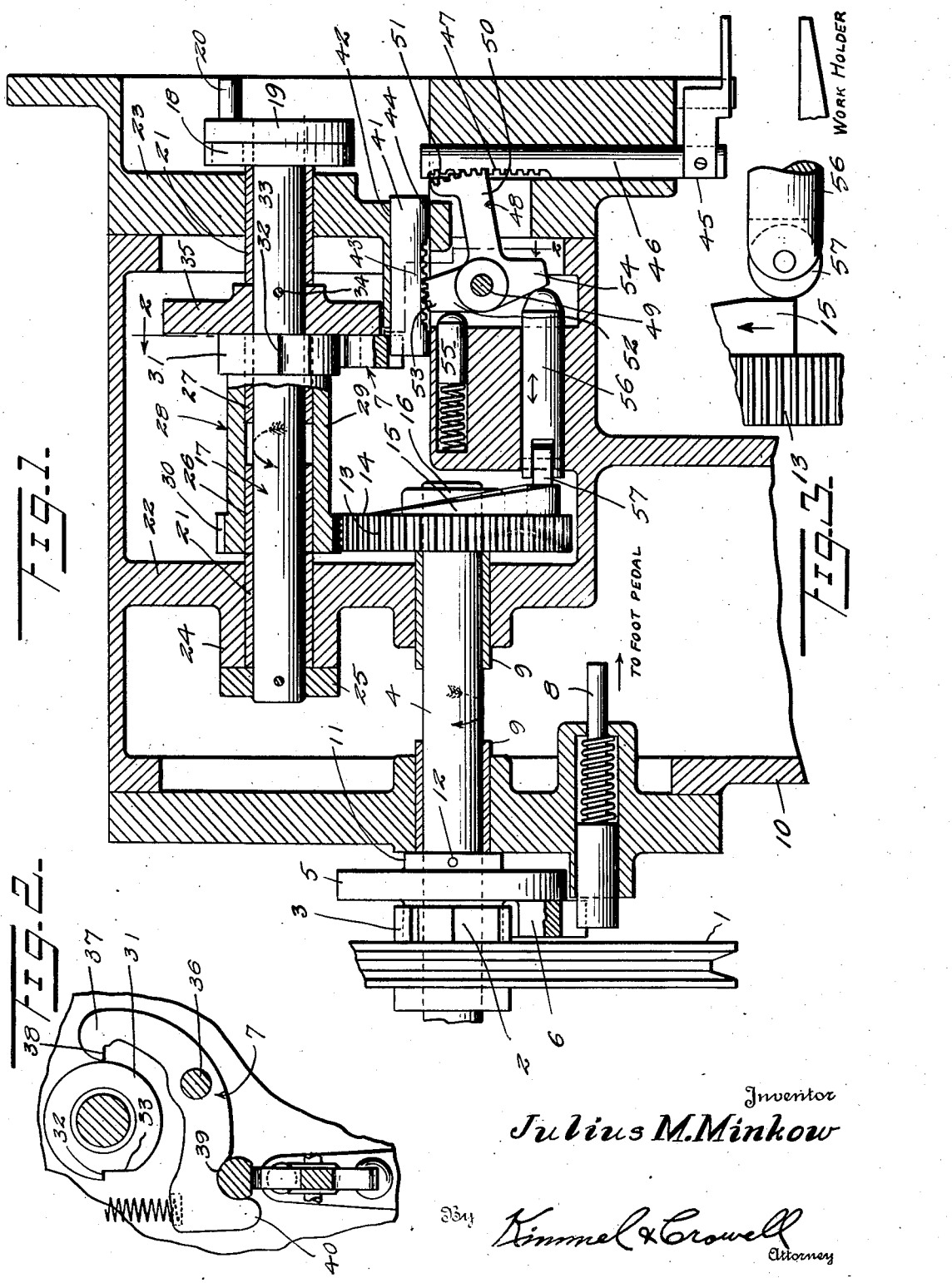

2,222,540

UNITED STATES PATENT OFFICE 2,222,540

SAFETY CONTROLLABLE DRIVING MECHANISM

Julius M. Minkow, New York, N. Y., assignor to Minco Products Corporation, New York, N. Y., a corporation of New York Application April 14, 1939, Serial No. 267,897

7 Claims. (Cl. 192—129)

This invention relates to a driving mechanism.

The object of the invention is to provide a driving mechanism having as a part thereof a safety controlled power transmission.

A further object of the invention is to provide a driving mechanism for use in connection with any type of machine for which it may be found applicable, and having as a part thereof a safety controlled power transmission controlled from an element of the machine to render said transmission inactive when an obstacle, such as the finger or hand of an operator interferes with the movement of such element thereby providing an element of safety and prevent injury to the operator.

Further objects of the invention is to provide, in a manner as hereinafter set forth a mechanism for the purpose referred to which is comparatively simple in its construction and arrangement, strong, durable, compact, readily assembled, thoroughly efficient in use for the purpose intended thereby, conveniently installed with respect to the machine with which it is to be employed, and comparatively inexpensive to set up.

Embodying the objects aforesaid and others which may hereinafter appear, the invention consists of the novel construction, combination and arrangement of parts as will be more specifically referred to and illustrated in the accompanying drawing, wherein is shown one embodiment of the invention, but it is to be understood that changes, variations and modifications may be resorted to which fall within the scope of the invention as claimed.

The invention is shown by way of example in connection with a wire stitching machine, but it is to be understood that a driving mechanism, in accordance with the invention is for use in connection with any type of machine for which it may be found applicable.

In the drawing:

Figure 1 is a fragmentary view in longitudinal section of a wire-stitching machine showing the adaptation therewith of a driving mechanism in accordance with this invention, Figure 2 is a fragmentary view on line 2—2, Figure 1, and Figure 3 is a detail illustrating the position of the controlling plunger of the cam actuated spring controlled controlling structure with relation to its actuating cam at the beginning and end of the cycle of the main driving means.

There is shown by way of example a prime mover in the form of a rotatable element 1 provided one side thereof with a ratchet 2 formed with any number of teeth 3 preferably eight.

The element 1 is driven from any suitable source and is loosely confined on the main shaft 4 of the driving mechanism. The latter includes a disc 5 which is fixedly secured to shaft 4 in juxtaposition to the ratchet 2. That face of the disc 5 which opposes the ratchet 2 has pivotally supported therefrom a spring controlled clutching pawl 6 of a form corresponding to that of the clutching pawl 7 shown by Figure 2. The pawl 6 permanently tends to engage a tooth 3 of ratchet 2 for the purpose of clutching the element 1 to the shaft 4 for driving the latter. The pawl 6 is normally held free of the ratchet 2 by a spring controlled slidably mounted plunger 8 which constitutes a latching member. The plunger is shifted from latching position relative to pawl 6 by a foot tread operated means, not shown or by an electrically operated pulling means, not shown. The drawing indicates that the inner end of plunger 8 is to be attached to a foot pedal. The shaft 4 is mounted in bearings 9 arranged in the body 10 of the wire stitching machine, and the hub 11 of disc 5 is arranged in juxtaposition to one end of said body and is fixed, as at 12 to shaft 4.

The inner end of shaft 4 has fixed thereto a power transmitting gear 13 having its side face 14 provided with a cam surface 15 for a purpose to be referred to. Means for retaining gear 13 on shaft 4 is indicated at 16.

Arranged adjacent to and spaced from the gear 13, as well as extending laterally in opposite directions relative to the gear 13 is a safety controlled power transmission shaft 17 carrying at its forward end a gear 18 and a disc 19 carrying an eccentric pin 20. The gear 18 is employed for operating the wire feed mechanism, not shown of the stitching machine. The disc 19 and pin 20 are employed for operating the staple forming and driving means, not shown of the wire stitching machine.

The transmission shaft 17 is mounted in bearings 21 arranged in partitions 22, 23. The shaft 17 extends forwardly from the partition 23. This statement also applies to the forward bearing 21. The partition 22 at one side is formed with an annular extension 24 in which a portion of the rear bearing is mounted. Fixed on the rear end of the shaft 17 and abutting the extension 24 is a retaining collar 25 secured to shaft 17. Revolubly mounted on the shaft 17 is a pair of spaced bushings 26, 27 disposed in endwise spaced relation and these bushings are fixed to the inner face of a clutch gear 28 consisting of a sleeve 29 provided at one end with a gear 30 and at its other end with a single tooth ratchet 31. The tooth of ratchet 31 is indicated at 32 and is disposed on the diametric center of the ratchet. Leading to the inner end of the tooth 32 is a flat surface 33 formed on the outer periphery of the ratchet 31. The tooth 32 everhangs the surface 33. The outer ends of the bushings 26, 27 align with the end edges of the sleeve 29. The bushing 26 abuts a bearing 21. Secured to the shaft 17 by any suitable means, such as the pin 34 is a disc 35 which abuts one end of the forward bearing 21 mounted on shaft 17. The other end of such bearing 21 abuts the gear 18. One face of the disc 35 opposes one side face of the ratchet 31. The disc 35 is of greater diameter than the diameter of ratchet 31. Pivotally mounted on a pin 36, carried by that side face of disc 35 which opposes a side face of ratchet 31 is the spring controlled pawl 7. The latter at one end is formed with a clutching nose 37 having an edge surface 38 corresponding to the surface of the tooth 32. The outer edge of the pawl 7 is formed with a groove 39 and a protuberance 40 extending beyond the mouth of the groove.

The gears 13, 30 constitute a multiplying gearing having ratio of 2 to 1. The gear 13 being the gear of the greater diameter of the said gearing.

There is associated with the pawl 7 a releasing plunger 41 therefor. Plunger 41 is slidably mounted in an opening 42 formed in the machine body and has one side thereof formed with a lengthwise row of teeth 43 which opposes an opening 44 formed in the machine body. The plunger 41 is capable of being shifted in opposite directions to and from the pawl 7. When shifted in the path of the pawl 7 it engages in the groove 39 and coacts with the protuberance 40 for shifting pawl 7 from clutching engagement with the ratchet 31. When plunger 41 is shifted in a direction from engagement with the pawl 7 the latter is released and the controlling spring for the pawl tends to move the nose 38 of the pawl in a direction to be positioned in the path of the tooth 38 of the ratchet 31, whereby the coaction of the tooth 32 and nose 38 will clutch the shaft 17 with the clutch gear 28 to provide for the operation of the stitching machine to form, drive and clinch the staples. Slidably mounted in the machine body is a vertically movable ring guard or foot explorer structure 45 having as an element thereof a vertically movable slide rod 46 provided lengthwise thereof on one side with a row of teeth 47. The structure 45 is lowered on the operation of the shaft 4. To provide for the elevating and lowering of the structure 45 an actuatable lever member 48 is employed and which is pivotally mounted, as at 49 in the machine body. The lever member 48 includes an arm 50 formed at its outer end with a curved rack 51 disposed upon the segment of a circle and engageable with the teeth 47. The lever member 48 further includes an arm 52 having its outer end toothed, as at 53 which engages with the teeth on the plunger 41. The teeth 53 are disposed upon the segment of a circle. The lever member 48 further includes an arm 54 for a purpose to be referred to. The arms 52, 54 are disposed tandemwise, that is to say arranged in endwise aligned relation. The arm 50 is disposed at right angles to the arms 53, 54. The arm 53 is disposed in the path of a spring controlled plunger 55 slidably mounted in the machine body. The arm 54 is disposed in the path of a controlling plunger 56 controlled by the cam surface 15. The plunger 56 at one end has pivotally mounted therein a roller 57 which coacts with the cam surface 15 for controlling the position of the plunger 56.

The arm 50 of the lever 48 engages with the rod 46 and acts to elevate and lower such rod. The arm 52 engages with the plunger 41 for shifting it to and from engagement with the pawl 7. The arm 54 coacts with the plunger 56 to provide for the pivoting of the lever 48 in a direction to provide for arm 50 elevating rod 46 and to provide for the arm 53 moving the plunger 41 to engage the pawl 7. The moving of the arms 50, 53 in the direction as shown in Figure 1 is against the action of the spring controlled plunger 55. When the roller 57 rides on the low stretch of the cam surface 15 the plunger 55 acts to shift lever 48 in the opposite direction to provide for arm 52 to move plunger 41 from engagement with the pawl 7 and to lower the rod 46 of the structure 45.

On the starting of the machine the controlling plunger 56 will be in the position shown in Figure 3 and the pungers 41, 55 and the lever 48 will be in a position as shown in Figure 1. On the operation of the main shaft 4 the controlling plunger 56 will be moved in a direction towards the gear 13 due to the fact that the roller 57 is moving down the low part of cam surface 15 and the action of the plunger 55 on arm 53 will cause arm 54 to move plunger 56 towards gear 13, and due to arm 43 being moved by plunger 55 the plunger 41 will be shifted from engagement with the pawl 7 to permit of the latter for clutching of the ratchet 31 to the transmission shaft 17. Further the arm 50 will lower the structure 45, but if there is an obstacle interposed in the downward path of the structure 45, arresting the downward movement thereof the plunger 41 will not be shifted a sufficient distance to release the pawl 7 thereby preventing the operation of the transmission shaft 17.

On the start of operation of the parts of the mechanism the ratchet 31 is in the position as shown in Figure 2 with respect to pawl 7. When plunger 8 is retracted from engagement with pawl 6 the main shaft 4 will make one complete revolution. During the first part of such revolution structure 45 is caused to be lowered through the action of arm 50. The time allowed for this aforesaid operation would be 90° of revolution of the main shaft 4. Due to the gear multiplying the sleeve 28 will revolve 180° which would position the tooth 32 directly in line with nose 38 of the pawl 7. If the structure 45 is allowed to move in a downward position unobstructed plunger 41 will be ejected entirely clear of engagement with pawl 7. This will cause nose 38 of pawl 7 to engage with the tooth 32 and cause transmission shaft 17 to make one complete revolution. During this revolution cam 15 has caused plunger 56 to operate on arm 54 and raise the structure 45. When the pawl 7, after making its revolution strikes the plunger 41 it is disengaged from the ratchet 31. The plunger 41 is moved to a position to engage the pawl 7 by the action of the cam surface upon the plunger 56 which rocks lever 48 in a direction to provide for arm 53 to shift plunger 41 to the position shown in Figure 1. Up to this point the main shaft 4 has revolved 270°. The balance of 90° of revolution of shaft 4 is used to return the tooth 32 to the original starting position as shown in Figure 2. In the interruption of the downward movement of the structure 45, which has been applied thereto on the operation of the main shaft 4 and which is due to the interposition of an obstacle in the downward path of the structure 45, such as the finger or hand of an operator the mechanism will then be controlled in a manner to set-up a safe guard element to prevent injury to the operator and such safe guard element consists in the elements of the mechanism which are associated with the main drive shaft 4 from shifting the plunger 41 out of engagement with the pawl 7, which results in the non-activity of the power transmission shaft 17. The manner in which the parts, which are associated with the main shaft 4 operate to set-up the safe guard has been heretofore referred to.

As is well known in a wire staple forming and driving machine a holder for supporting the work to be stapled is arranged below the staple forming and driving devices of the machine. The holder in most instances provides means for clinching the staple. The foot explorer as referred to is to be arranged in the operative path or adjacent to the operative path of the said staple forming and driving device. The structure 45 may also be termed a controlling element for the actuable elements or mechanisms of the stitching machine.

What I claim is:

1. In a controllable driving mechanism for a machine of that type including a shiftable controlling element, the combination of a revoluble normally latched main driving means operable from a prime mover, a revoluble normally inactive driven structure for actuating other elements of the machine with which said mechanism is associated, a revoluble power transmission means encompassing said driven structure operated from said driving means for operating said driven structure, said power transmission means and driven structure having controllable engageable parts coacting at a point during a part of the first revolution of said transmission means to provide for the operation of said driven structure by said power transmission means, said main driving means and power transmission means having coacting parts to constitute a speed multiplier to increase the ratio of said transmission means and driven structure with respect to said driving means, and means operated from the main driving means for shifting said controlling element in opposite directions and including a shiftable part, when said shiftable controlling element moving in one direction meets with an obstruction acting to hold said coacting engageable parts out of engagement to prevent the operation of said driven structure from said transmission means during the operation of the latter and said main driving means.

2. In a controllable driving mechanism for a machine of that type including a shiftable controlling element, the combination of a normally revoluble latched main driving means operable from a prime mover, a revoluble driven shaft for actuating other elements of the machine with which said mechanism is associated, a revoluble power transmission means operated from said driving means encompassing and for operating said driven shaft, said power transmission means and driven shaft having controllable engageable parts coacting at a point during a part of the first revolution of said transmission means to provide for the operation of said driven shaft by said power transmission means, said main driving means and power transmission means having coacting parts to constitute a speed multiplier to increase the ratio of said driven shaft and transmission means with respect to said driving means, and cam controlled spring actuated means operated from the main driving means for shifting said controlling element in opposite directions and including a shiftable slidable part, when said shiftable controlling element moving in one direction meets with an obstruction to hold said coacting engageable parts out of engagement to prevent the operation of said driven shaft from said transmission means without discontinuing the operation of the latter and said main driving means.

3. In a controllable driving mechanism for a wire stitching machine of that type including a downwardly movable foot explorer for locating obstructions in the operative path of the staple former or driver between the latter and the work support of the machine, the combination of a latchable main driving means operated from a prime mover, a driven means including a rotatable element operated from said driving means and a shaft disposed in coaxial relation with said rotatable element for actuating other elements of the machine, said rotatable element and shaft including coacting interengageable parts to provide for the operation of said rotatable element and shaft in unison, shiftable means for controlling the interengaging and disengaging of such parts, and a cam actuated spring controlled structure operated from said driving means common to and for shifting said shiftable controlling means and the foot explorer in opposite directions and including means when said explorer meets with an obstruction for holding said shiftable controlling means in a position to prevent the engagement of such parts whereby the operation of said shaft is prevented without discontinuing the operation of the rotatable element and main driving means.

4. A controllable driving mechanism for a wire stitching machine of that type including a downwardly movable shiftable foot explorer for locating obstructions in the operative path of the staple former or driver between the latter and the work support of the machine, the combination of a latchable main driving means operated from a prime mover, a driven means including a rotatable element operated from said driving means and a shaft disposed in coaxial relation with said rotatable element for actuating other elements of the machine, said rotatable element and main driving means having coacting interengaging means to constitute a speed multiplier to increase the ratio of said shaft and rotatable element with respect to the driving means, said rotatable element and said shaft including coacting interengageable parts made active after a part of a revolution of said rotatable element to provide for said rotatable element and shaft operating in unison, shiftable means for controlling the interengaging and disengaging of such parts, and a cam actuated spring controlled structure operated from said driving means and including a lever common to said shiftable controlling means and the foot explorer for moving them in opposite directions and providing, when said explorer meets with an obstruction in one direction of its movement for holding said shiftable controlling means in a position to prevent the engagement of said parts whereby the operation of said shaft is prevented without discontinuing the operation of said rotatable element and driving means.

5. In a controllable driving mechanism for a machine of that type including the combination of a shiftable controlling element, a main driving means operable from a prime mover, a driven structure for actuating other elements of the machine with which said mechanism is associated, a power transmission means operated from said driving means for operating said driven structure, said power transmission means and driven structure having controllable coacting interengaging parts made active after a part revolution of said transmission means to provide for said transmission means and structure operating in unison, said main driving means and power transmission means having coacting parts to constitute a speed multiplier to increase the ratio of said driven structure with respect to said driving means, a plunger for controlling said coacting interengaging parts and a cam controlled and spring actuated means operated from the said main driving means for shifting said plunger and controlling element in opposite directions and including means controlled from said element when the latter meets with an obstruction for holding said plunger at a position to maintain said coacting engageable parts out of engagement to prevent the operation of said driven structure from said transmission means without discontinuing the operation of the latter and said main driving means.

6. In a controllable driving mechanism for a machine of that type including an oppositely slidable controlling element, the combination of a driven structure for operating the machine, a revoluble power transmission for said shaft, said transmission and shaft being disposed in coaxial relation and said transmission being normally free of connection with said shaft, said shaft and transmission having controllable correlated engageable parts for clutching the transmission to said shaft to provide for the operation of the latter, a drive shaft, a multiplying gearing between the drive shaft and the transmission providing for the operation of the latter, a slidably mounted plunger controlling the said correlated engageable parts, and a cam controlled spring actuated means operated from said multiplying gearing for shifting said plunger and controlling element in opposite directions and acting to move said plunger in a direction to hold said correlated engageable parts out of engagement to prevent the operation of the driven shaft from the transmission, during the operation of said transmission and driving shaft when said shiftable controlling element moving in one direction meets with an obstruction.

7. In a controllable driving mechanism for a machine of that type including an oppositely slidable controlling element, a combination of the driven shaft for operating the machine, a rotatable power transmission driving said shaft, said transmission being mounted about and normally free of connection with said shaft, said transmission including a gear, a drive shaft, a gear on said shaft meshing with and of greater diameter than the gear on the transmission shaft, said driven shaft and transmission having controllable correlated engageable parts for clutching the transmission to said driven shaft to provide for the operation of the latter, a plunger for controlling the said correlated engageable parts, a spring controlled pivoted lever common to and for shifting said plunger and controlling element in opposite directions, a slidable member for shifting said lever against the action of its controlling spring, and cam means carried with the gear on said drive shaft and coacting with said member to provide said lever shifting said plunger in a direction to prevent the coaction of said correlated engaging parts when said controlling element moving in one direction meets with an obstruction.

JULIUS M. MINKOW.